United States Patent [19]

Hulland et al.

[11] Patent Number: 4,642,648

[45] Date of Patent: Feb. 10, 1987

[54] SIMPLE PASSIVE/ACTIVE PROXIMITY WARNING SYSTEM

[75] Inventors: Burton L. Hulland, Glenwood Landing; George B. Litchford, Northport, both of N.Y.

[73] Assignee: Litchstreet Co., Northport, N.Y.

[21] Appl. No.: 589,524

[22] Filed: Mar. 14, 1984

Related U.S. Application Data

[63] Continuation-in-part of Ser. No. 351,275, Feb. 22, 1982, Pat. No. 4,486,755.

[51] Int. Cl.⁴ .............................................. G01S 3/02
[52] U.S. Cl. .................................... 342/455; 342/456; 342/45
[58] Field of Search ................... 343/455, 456, 6.5 R, 343/6.8 R, 10

[56] References Cited

U.S. PATENT DOCUMENTS

| | | | |
|---|---|---|---|
| 3,626,411 | 12/1971 | Litchford | 343/455 X |
| 3,680,115 | 7/1972 | Bickel et al. | 343/396 |
| 3,735,408 | 5/1973 | Litchford | 343/6.5 R X |
| 3,757,324 | 9/1973 | Litchford | 343/6.5 R |
| 3,858,210 | 12/1974 | Litchford | 343/11 R |
| 3,858,211 | 12/1974 | Litchford | 343/16 R |
| 3,875,570 | 4/1975 | Litchford | 343/6.5 LC |
| 3,895,382 | 7/1975 | Litchford | 343/6.5 LC |
| 3,921,172 | 11/1975 | Litchford | 343/16 R |
| 3,959,793 | 5/1976 | Litchford | 343/6.5 R |
| 4,021,802 | 5/1977 | Litchford | 343/6.5 LC |
| 4,027,307 | 5/1977 | Litchford | 343/6.5 LC |
| 4,107,674 | 8/1978 | Funatsu et al. | 343/6.5 R |
| 4,115,771 | 9/1978 | Litchford | 343/6 R |
| 4,128,839 | 12/1978 | McComas | 343/455 |
| 4,161,729 | 7/1979 | Schneider | 343/6.5 R |
| 4,196,434 | 4/1980 | Funatsu et al. | 343/6.5 R |
| 4,293,857 | 10/1981 | Baldwin | 343/6.5 R |
| 4,442,430 | 4/1984 | Schneider | 343/6.5 R |

FOREIGN PATENT DOCUMENTS

890497 2/1962 United Kingdom.
1278451 6/1972 United Kingdom.

OTHER PUBLICATIONS

Radio Technical Commission for Aeronautics (RTCA) Technical Paper No. 341-82/SC147-101 dated Dec. 17, 1982 and entitled "Passive Time of Arrival Applications of TCAS-1".

Article entitled "New PWI for General Aviation Proposed", by Philip J. Klass, *Aviation Week & Space Technology*, dated Sep. 16, 1968.

Article entitled "Beacon Proximity Warning Unit Outlined", *Aviation Week & Space Technology*, dated Sep. 20, 1971.

Article entitled "Bendix Flight-Tests a 'Listen-In' PWI", by Philip J. Klass, *Aviation Week & Space Technology*, dated Sep. 25, 1972.

*Primary Examiner*—Theodore M. Blum
*Assistant Examiner*—John B. Sotomayor
*Attorney, Agent, or Firm*—Brumbaugh, Graves, Donohue & Raymond

[57] ABSTRACT

A simple active/passive proximity warning system for an Own station that uses differential time of arrival values, direct time of arrival values, and differential altitude values determined from 1030 MHz interrogations from ground-based SSRs and Own station and 1090 MHz transponder replies from Other stations to identify threats is disclosed. The invention combines a passive detection system and an active detection system into an integrated system that overcomes the limitations present when either type of system is used by itself. Generally speaking, the passive system identifies threats and produces a threat alert when the differential altitude value and the largest time of arrival value associated with an Other station are below predetermined values. A preferred embodiment of the active system monitors the environment for SSR density, classifies the environment into a plurality of "cases", and automatically selects in response thereto one of a plurality of control modes. The control mode selected determines in whole or in part whether interrogations will be produced by an interrogator in the active system, and the rate at which they are produced. In one embodiment, the active system has three control modes, the first of which continuously produces sets of interrogations at a relatively low transmission rate, the second of which selectively produces a set of interrogations upon detection of a potential threat, and the third of which produces no interrogations. The integrated system includes a number of features which improve the performance and reliability of the system, minimize interference with other ATC systems, and minimize false alarms.

38 Claims, 5 Drawing Figures

SIMPLE PASSIVE/ACTIVE PROXIMITY WARNING SYSTEM

This application is a continuation-in-part of application Ser. No. 351,275 filed Feb. 22, 1982, U.S. Pat. No. 4,486,755 and is assigned to the assignee of the parent application.

BACKGROUND OF THE INVENTION

This invention relates to passive detection systems for indicating the proximity of an Own station to any Other station that is equipped with a standard SSR (or equivalent ATCRBS) transponder, and to active detection systems employing an on-board interrogator at Own's station to detect any of said Other stations that are in proximity to Own station, and to combinations of such passive and active systems.

Many collision avoidance systems (CAS) using airborne transponder signals have been proposed. Some of these have been built and tested with varying degrees of success. The simplest systems merely receive Others' transponder replies, relying on the received signal strength to determine approximate range from Own. Other systems depend on two-way transmissions between Own and Other's transponder to provide range information. Said systems are subject to unacceptably high false alarm rates, particularly in dense aircraft environments, where reliable warnings are most needed. Still other systems involve airborne radio direction finding from Own to Others' transponders. Suitable direction finders have not been implemented, and are probably infeasible in the present state of the art.

Others have suggested the use of an on-board interrogator at Own's station to detect intruders. This, of course, works when there are no ground radars within range (providing the intruder's transponder is turned on in such an environment). It, however, suffers from two problems. First, when the density of equipped aircraft is high, the large total number of transmissions, which is related to the square of aircraft density, will degrade the performance of the ground ATC radar system, and possibly any other airborne SSR-based CAS. Second, when the density of other aircraft around such an interrogator is high, the replies from these aircraft will garble each other ("synchronous garble") and prevent decoding of the replies to determine relative altitude.

Other systems, using the time delay between reception at Own's station of an interrogation message from a particular SSR and reception of an Other reply to said interrogation, are described in numerous patents, for example the following:

U.S. Pat. No. 3,626,411
U.S. Pat. No. 3,735,408
U.S. Pat. No. 3,757,324
U.S. Pat. No. 3,858,210
U.S. Pat. No. 3,858,211
U.S. Pat. No. 3,875,570
U.S. Pat. No. 4,021,802
U.S. Pat. No. 4,027,307

These systems discriminate strongly against false alarms and provide various information about possible threats, such as range, bearing, differential altitude and identity. In general, the complexity of such a system is directly related to its capability. The technical feasibility of these systems has been demonstrated in a number of studies and tests. See, for example, the following reports: J. Vilcans et al., "Experimental BCAS Performance Results", U.S. Dep't. of Transportation, Report No. FAA-RD-78-53, dated July, 1978; and "Final Report For Feasibility Testing of the SSR Collision Avoidance System," dated June, 1976 and prepared under Contract No. F19628-75-C-0193 for the Electronic Systems Division of the United States Air Force Systems Command, Hanscom AFB, Bedford, MA 01731.

Research and development efforts on such systems have focused primarily on large systems suitable for commercial airlines which would three-dimensionally track transponder-equipped Other stations that are or might possibly become threats, visually display accurate bearing, range, and altitude information regarding such Other stations, including suitable alarms when a threat is detected, and also provide recommendations for evasive action such as turns, climbs and dives to avoid the threat. Using present-day technology, these large systems are presently expected to sell for over $60,000.00 each, which places them well above what most general aviation aircraft owners could afford or would be willing to spend.

The above-identified patents provide general background information which may assist those new to the art gain a fuller understanding of the operation of and advancements embodied in the present invention. Selected teachings from some of these patents are discussed below to assist those in the art to compare and contrast the present invention with earlier inventions and developments in the general field of proximity warning/collision avoidance systems.

U.S. Pat. No. 3,626,411 discusses, among other things, how the reception of at least two, and preferably three or more, successive 1090 MHz replies during an equal number of successive listen-in periods may be used to minimize the possibility of false proximity indications. It discloses a switch and pulse counter-based system for detecting such successive replies.

U.S. Pat. No. 3,735,408 discloses, among other things, a proximity warning system that indicates the presence of an intruder in a defined common azimuth sector that is wider by selectable amounts than the main SSR beam. In one embodiment of the system, the relative strength of the P2 pulses is monitored to determine when to expand or reduce the size of the widened azimuth sector. This allows the sector width to be deliberately reduced when the approximate distance between Own station and the SSR exceeds a predetermined amount. A 1090 MHz receiver disclosed therein includes a threshold device which initially raises the threshold of the receiver about 3 db for a 25 microsecond period during part of the listen-in period at Own station to discriminate against noise pulses or interference.

U.S. Pat. No. 3,875,570 (the '570 patent) discloses fairly complex proximity indicating systems having active and passive system portions which automatically adapt to changing SSR environments. Specifically, that patent discloses means for measuring the interrogation rate detected by Own station, and means for modifying the mode of operation of the proximity indicating system in dependence upon this rate to optomize system performance. As used therein, the term "interrogation rate" denotes the number of valid interrogations received from SSR ground stations per unit of time. Multiple modes of operation (two through five or more modes) based upon a classification of the SSR environment and/or upon a classification of the number of Other stations in the vicinity of Own station are also discussed. Further, it is disclosed that the azimuth listening sector of an SSR main beam may be widened or narrowed to vary the volume of monitored space. The patent also states the following. In a signal environment absent nearly all interrogations, the range of nearby aircraft may be obtained actively by the low-power omnidirectional transmission of interrogations. Such air-to-air interrogation may be on either the reply channel (1090 MHz) or the interrogation channel (1030 MHz) depending upon the sensing of the actual environment. Absent all ground interrogations the 1030 MHz channel may be used. The presence of many interrogations and replies requires the use of 1090 MHz interrogations (air-to-air) employing the proximity gated volumes of the threatening aircraft or its identity/altitude relationship to prevent undesired interrogations of non-threatening aircraft as well as undesired slant range replies.

The '570 patent also teaches that, in the case of a single identified intruder aircraft (a single Other station), the largest differential time of arrival (TOA or T) value from a group of TOA values determined in response to the interrogations of that aircraft by a multiplicity of SSR stations, say five or six, is the TOA value giving the most accurate indication of true slant range or separation between Own station and the intruder aircraft. Further, it discloses a means for storing such values and selecting the largest TOA.

The '570 patent also discusses Own station using a low power 1030 MHz interrogator with a very low interrogation rate to actively solicit transponder replies from possibly threatening aircraft in regions where SSR coverage is low or nonexistent, as determined by monitoring SSR interrogation rates.

U.S. Pat. No. 4,021,802 discusses a collision-predictive CAS that produces TAU data relating to differential azimuth, TOA, and/or altitude information from selected standard SSR interrogation and replies. In multiple SSR radar environments, the disclosed CAS operates in a manner that provides increased discrimination against false alarms. The patent discusses the identification of each SSR (and the data it produces) by its unique pulse repetition characteristic (PRC) and beam rotation period. Similarly, it discloses that all data obtained with regard to each particular transponder-equipped Other station may be identified and distinguished from that of different Other stations by the assigned identity reply code and/or any other suitably unique characteristic of Other's reply, such as its relative positional parameters. The patent discloses filtering means based upon the identification of and the individualized PRC selection of or lock to each SSR to identify and distinguish interrogations and replies associated with one SSR from those associated with another SSR. PRC is defined in the patent to include both uniform and staggered pulse repetition periods (PRP). The CAS disclosed shows a PRC selector as part of the filtering means used to associate a given reply containing identity or altitude information with a specific SSR. The patent also mentions that such a CAS may be entirely passive, or may be combined with other, active or semiactive, systems as a back-up or a false alarm filter.

U.S. Pat. No. 4,027,307 discloses a fairly complex collision avoidance/proximity warning system that determines both bearing and range, and employs among other things, a direction-finding antenna. It also discloses a passive collision avoidance system which stores multiple slant range values and averages them for a more accurate slant range value. Also disclosed is an active system for detecting the presence of an intruding aircraft and measuring its slant range and bearing by actively transmitting at 1030 MHz low power interrogations at a low rate such as 10 Hz. The patent further suggests that the active and passive systems may be used in combination, with the active system being used only when a passive range and bearing determination cannot be made.

Other development efforts, disclosed in U.S. Pat. Nos. 4,107,674 and 4,196,434, have also combined passive and active detection techniques in a single collision avoidance system. These two patents teach that while passive detection techniques may be used to detect the presence or absence of nearby transponder-equipped Other stations, active interrogations need to be used to obtain accurate range measurements. In both these patents, the passive detection systems disclosed incorporate not only time-based passive detection of Other stations, but also passive detection based upon the electric field strength of reply messages received from Other stations. The passively produced information is not used itself to determine whether a threat exists, but rather is used to control when and/or how the active system transmits 1030 MHz interrogations to effect an active range measurement between Own station and an Other station. Information from active range measurement is utilized either for determining whether Other station is a threat, or for collision-predictive tracking purposes.

U.S. Pat. No. 4,107,674 also teaches, among other things, that the interrogation transmission power and/or period between transmissions may be varied to reduce the amount of interference that active interrogations from Own station will cause to the existing SSR system. Specifically, the interrogations may be altered in accordance with the perceived distance between Own station and Other station as follows. If no Other station is detected, interrogations at 30 watts having a interval of 3 seconds between interrogations are transmitted from Own station. If an Other station is detected within a perceived distance of 10 nautical miles (NM) from Own station, interrogation power is increased to 300 watts while the interval between successive interrogations is increased to 12 seconds. As the detected Other station moves to within 4.5 NM as determined by active measurement, interrogation output power is decreased to 30 watts and the interval is linearly decreased from 12 seconds to 3 seconds. The patent also suggests altering the transmission power and the period based upon the difference in altitude between Own and Other, or upon the perceived approaching speed between Own and Other. One embodiment disclosed therein varies transmission power and period between the two aforementioned sets of values whenever the time-based passive detection value is less than 120 microseconds, or the received reply signal strength is over −60 dBm, or the number of interrogations in 12 seconds less than 100.

U.S. Pat. No. 4,196,434 discloses, among other things, an active/passive collision avoidance system wherein the number of interrogations per second from Own station and the output power is a function of position or location information obtained from previous active surveillance measurements. Specifically, the system disclosed therein uses two different interrogation power levels, and two different interrogation rates. The lower interrogation rate (2 sets of 10 interrogations each every 12 seconds) is used whenever at least one Other station is detected within 14 NM. It is also used if the number of interrogations received by Own station falls below 7 interrogations per second, which indicates that Own station is outside the coverage zone of SSR ground stations. The higher interrogation rate (1 set of 10 interrogations every 3 seconds) is used whenever an Other station is within 1.8 NM of Own or approaching faster than 43.5 m/sec, and has (or will shortly have) an altitude difference of less than 800 feet. In the words of the patent, "the interrogation period is selected as a function of the aircraft being an intruding or a threat aircraft." The higher interrogation power (300 watts) is the normal transmission power. The lower interrogation power (30 watts) is used in those instances where an Other station is within a 4 NM range of Own and (predicted) collision time is less than 40 seconds. The lower power level is said to reduce interference with Other stations and ground SSR stations, and make it possible for only the nearby aircraft to receive Own's interrogations.

The CAS disclosed in this patent also monitors the number of interrogations per second received by Own station to determine whether or not to increase the sensitivity of that passive detection equipment which monitors the field strength of received reply messages to determine whether any Other stations are within 14 NM of Own. If less than 20 interrogations per seconds are received (which is said to indicate roughly that less than 3 ground SSR stations are interrogating Own), the sensitivity level is increased from −65 dbm to −75 dBm within 12 seconds to provide greater detection capability.

A number of the foregoing patents, as well as other references in the art, set forth detailed facts relating to the characteristics of interrogation and reply messages in the SSR system, and the SSR system itself. While it is neither necessary nor desirable to review all such facts here, since most are common knowledge in the art, a few of them are mentioned below for convenient reference. Over 200,000 aircraft, including virtually all commerical transport aircraft and nearly all aircraft using major airports, are equipped with ATCRBS transponders. There are now approximately 3,000 SSR ground stations worldwide, and new stations are continuously being built. Each SSR ground station repeatedly transmits interrogations at a frequency of 1030 MHz on a continuously rotating beam. These beams, which conventionally are between 3 and 4 degrees wide and may occasionally be up to 6 to 7 degrees wide, sweep the sky in a clockwise direction. As the main beam of each SSR sweeps past an aircraft, it interrogates that aircraft's transponder with transmissions having a frequency of 1030 MHz, and each interrogation received initiates reply transmissions from the transponder at a frequency of 1090 MHz. Typically, a radar beam from an SSR site near an airport makes one full revolution every four seconds, while enroute longer range SSR radars typically revolve once every ten seconds, although some rotate as slowly as once every fifteen seconds. Effective beam range varies primarily upon transmission power, and commonly is between about 60 to 200 miles. Effective beam width varies, and depends not only on factors such as the design the radar antenna and distance of the aircraft to the radar, but also upon variations in both the transponder's SLS circuitry and the sensitivity of the transponder's 1030 MHz receiver. This last factor results from the fact that effective beam width is usually defined as the width of the space traversed by the beam axis while triggering a transponder.

Almost all SSRs are geographically distributed where possible to ensure effective radar coverage for use by aircraft controllers from different localities. Accordingly, the lines of sight between an aircraft at most any location and any two SSRs will not be congruent or superimposed on another. Such congruence does sometimes occur however, as when a short range SSR radar is positioned almost directly between an aircraft and a long range SSR radar. The characteristics of individual 1030 MHz interrogations and 1090 MHz replies, such as the pulses therein and their timing relationships, have often been described, as for example in ICAO Annex 10, and thus will not be repeated here. However, it is worthwhile to note that SSR ground stations continuously transmit interrogations at regular intervals between about 2 and 5 milliseconds. This interval is called the pulse repetition period (PRP). Its inverse value is called the pulse repetition frequency (PRF). Each SSR ground station within line of sight of an aircraft has a separate, unique PRF, and it also has a distinct beam rotation period (which for most short range SSRs near airports is typically somewhere about 4 seconds) to avoid sweeping the sky in synchronism with other nearby SSRs. The PRF's fall in the range of about 200 Hz to 400 Hz, separated by intervals of 4 or 5 Hz so that 40 to 50 separate PRF's are availabe for use by ground stations. Most often, the PRFs of SSRs are uniform, but occasionally so-called staggered PRFs are utilized, typically in denser SSR environments. This kind of pulse repetition pattern is composed of large steps in the spacings of the pulse train. 8-step staggers and 5-steps staggers are typical for this kind of SSR.

Typically, a main beam from an SSR, as it scans by an aircraft, repetitively interrogates the aircraft transponder between about 15 and 40 times. In response, the transponder generates a "beam burst" of repetitive replies that mimics the PRP of the interrogating beam. Not all interrogations produce replies however, and occasionally extraneous replies are produced by the transponder. These last two anomalies are due to such factors as ground clutter, multipaths, spurious signals, overlapping interrogations and the like. An interrogating beam may solicit up to thirty replies per beam burst, but a typical number of replies solicited has been reported to be about 18.

There is a current and compelling need for collision avoidance systems suitable for light aircraft such as those used in general aviation. Such systems have been designated TCAS-1. They must provide basically adequate collision threat warnings, but must also be simple and economically feasible for the owners of light aircraft. A paramount requirement is that they must minimize false alarms, while still assuring alarms in response to true threats.

In light of the foregoing problems and needs, it is the principal object of the present invention to provide a novel passive system and a novel active system, and to combine them in a novel manner which overcomes perceived limitations of using either a passive system or an active system by itself. Another very important object of the present invention is to provide a combined active/passive collision avoidance system which is economically affordable by the owners of light aircraft. Other objects of the present invention include: (1) combining the passive and active systems in a manner which allows the passive system to be continuously operational if desired; (2) providing an integrated passive/active system wherein selected elements and signals may if desired be jointly used by the passive system and the active system for increased reliability and reduced cost; (3) providing a simple and automatic means and/or method for sharing and for combining the information utilized in a passive system and in an active system; (4) providing a proximity warning system which does not require use of North pulses at SSR stations nor any other modification to SSR stations; (5) providing an effective proximity warning system for light aircraft which does not require determination of the course or bearing of either Own station or Other station; (6) providing a proximity warning system suitable for general aviation aircraft in any type of SSR environment including airspace covered by either zero, one, two, three, four or more SSRs; (7) providing an active/passive proximity warning system that automatically senses and adjusts itself to the various SSR environments it may operate in; (8) providing proximity warning system having interrogation capability which automatically adjusts itself in response to its environment in a manner which tends to minimize the risk of interfering with other ATC systems, whether ground based or airborne, including reducing the transmission rate and/or power of its active interrogations; and (9) providing a proximity warning system employing active interrogations having a randomized pulse repetition period (PRP) and/or randomized intervals between sets of transmissions to minimize interference with other ATC systems and to improve its own performance in higher traffic density environments.

SUMMARY OF THE INVENTION

In accordance with the objects above stated, one aspect of the present invention provides a simple and relatively inexpensive integrated proximity warning system for an Own station having an active system portion and a passive system portion which are combined in a way which overcomes the limitations present when either an active system or a passive system is utilized individually. In one embodiment of the present invention, the proximity warning system for an Own station is comprised of five basic "means" elements. The first element is means for selectively enabling the production and transmission of 1030 MHz interrogation messages at Own station at least in part in response to the SSR environment sensed at Own station. The SSR environment may be sensed, for example, by determining the approximate number of SSRs interrogating Own station. The second element is means for producing from received interrogation messages transmitted by SSRs within operational range of said Own station and received reply messages transmitted by transponder-equipped Other stations in response to said SSR interrogation messages during a predetermined period following reception of each said interrogation message at Own station, a differential time of arrival value for each of said Other stations with respect to each of said SSRs. The third element is means for producing from received reply messages transmitted by said Other stations in response to said interrogation messages from Own station during a predetermined period following transmission of each said interrogation message from Own station, a direct time of arrival value for each of said Other stations with respect to Own station. The fourth element is means for selecting from among the several most recent time of arrival values produced by the second means element if any and by the third means element if any, the largest time of arrival value associated with each of said Other stations that has been substantially duplicated a predetermined number of times. The fifth basic element is means for producing a threat alert output in response to any time of arrival value selected by the fourth means element that is below a predetermined value. When united as disclosed herein, these five basic elements cooperate to produce a number of significant advantages not found in the prior art.

The differential altitudes between Own station and transponder-equipped Other stations may be advantageously used to further discriminate between nearby Others to determine which are harmless and which are real threats. This capability may be provided in the aforementioned embodiment of the present invention by adding two more means elements thereto, namely: means responsive to altimeter at Own station and to said received reply messages containing altitude information for producing a differential altitude value for each said identified Other station with respect to Own station; and means for preventing the fifth means element from generating said threat alert output in response to time of arrival values associated with any of said Other stations whose differential altitude values are greater than a predetermined amount. Other embodiments of the present invention are presented below, as are other elements which may be added to the various embodiments of the present invention. A more detailed summary of the passive system portion and the active system portion employed in most embodiments of the present invention will now be provided to help explain in general terms the operation thereof.

In the passive system portion of this invention, an Own station receives interrogations from at least one SSR, and usually several SSRs within operating range, not only when the main beam of an SSR is pointing at it but also when Own station is illuminated by (that is, when Own station detects) a side lobe of the main beam. During a brief period, sometimes called a "listen-in" period, Own station receives replies transmitted by transponders at Other stations in the general vicinity of Own station in response to each interrogation from an SSR. The received replies are decoded to produce identification and differential time of arrival, hereinafter denoted T, and when available, differential altitude associated with each said Other station.

The identities and corresponding data are stored for several interrogation repetition periods in a running fashion, updating the storage periodically by replacing the oldest currently stored information with the newest decoded information. Identities and related data that are duplicated or approximately duplicated a predetermined number of times during a storage period are selected and stored separately for a length of time at least as long as the longest SSR beam rotation period. Those identities and associated data not so duplicated are discarded.

From the remaining stored correlated groups of identify and data those containing differential altitudes greater than a predetermined value are discarded; of those remaining that relate to a common identity but contain different values of T, only the largest value of T is selected. Whenever any such selected largest value of T is less than a predetermined value a warning or threat alert signal is produced. The quantitative value of an alarm-producing T and the associated identity and differential altitude may also be displayed.

Preferably the display of T is in terms of distance, i.e., one-half the distance radiation travels during the time T. This distance is hereinafter denoted as pseudo range, and corresponds to the actual range to a degree that depends upon the positional relationships between Own and Other stations and the SSR. The pseudo range is never greater than the actual range. When Own and Other stations are both interrogated by a number of SSRs, the largest value of the pseudo range associated with a particular Other may closely approximate the actual range of said Other.

The passive detection system may and preferably does remain in operation at all times since it does not interfere with any aspect of any other ATC system. At worst, the passive detection system does not generate any information such as when there is no SSR in effective range, or merely generates inaccurate pseudo range information, which as explained would be an understatement, but not an overstatement, of the true range.

In the active system portion of this invention, an Own station receives interrogations from SSRs within the vicinity of Own station (if there are any), classifies the type of SSR environment Own station is presently in, and automatically adjusts itself to operate within the type of environment detected in a manner that in most environments improves the over-all completeness and/or accuracy of threat detection provided by the passive system. The active system also operates in a manner to minimize interference with other ATC systems including other CAS devices, whether ground-based or airborne. Specifically, the active system of the present invention transmits standard SSR interrogations at 1030 MHz from Own station, preferably omnidirectionally, in a manner and rate determined by control logic within the active system. These transmissions are preferably not enabled except when needed since they are capable, if used, of interfering with other ATC systems.

The active system determines the type of SSR environment Own station is presently in by determining how many SSRs are interrogating Own station. This is preferably done by counting the number of interrogations Own station receives over a period of time which is long compared to the rotational period of the radar antennas at SSR ground sites. Alternately, other techniques may be used to determine the number of SSRs interrogating Own station, such as identifying pulse repetition characteristics of individual SSR sites. In a preferred embodiment of the present invention, the information needed to determine the number of SSRs interrogating Own station is obtained by examining the output of the 1030 MHz receiver used in the passive detection system.

In the present invention, the classification of SSR environment is preferably arranged according to the number of distinct control modes which might be utilized in controlling the operation of the active system, that is when and in what manner 1030 MHz transmissions will be allowed. In the present disclosure, four different SSR environments (also called cases) are identified and possible control modes or strategies in response to each are explained. A preferred embodiment of the present invention shown in the FIG. 1 utilizes only three control modes, because it does not distinguish between Case 1 and Case 2 set forth below. Experience in the field may show, and those skilled in art should appreciate, though, that fewer or more control modes may be optimal. Thus, it is intended that the present invention encompass an integrated system of the type described herein whether it employs two, three, four or more than four control modes in the active system. Four illustrative cases and the manner in which an active system of the present invention might operate in response to each may be described as follows:

Case 1—No effective coverage by SSR ground radar. Accordingly, the active system must transmit interrogations at 1030 MHz at an active interrogation rate with sufficient power for effective coverage.

Case 2—Coverage by a single SSR ground radar. In this case, the passive detection system will detect the presence of most intruders, but may produce excessive unwanted alarms due to poor "pseudo-range" information. The active detection system should be enabled (possibly at a reduced interrogation rate) to detect intruders which are missed due to interference by Own's transponder replies. It should also be used to obtain range information when the passive system indicates a possible intruder.

Case 3—Coverage by two or three SSR ground radars. Since it is unlikely that all of the ground radars are at exactly the same direction from Own station, passive detection of intruders should be reliable. The active system is preferably not used for detection. However, since this number of SSR ground radars is typically indicative of airspace with a fairly low traffic density, and since a possibility exists that all of the radars may be in one general direction (which could result in poor passive "pseudo range" information), the active system preferably should be activated for a single cycle or set of interrogations whenever the passive system indicates a possible intruder. As will be more fully appreciated below, this procedure allows the active system to confirm or negate the existence of an intruder which the passive system has indicated exists, while minimizing interference with other ATC systems.

Case 4—Coverage by four or more ground radars. This case is usually found in a higher traffic density area than the previous cases, and in such areas, the active system would be more likely to be ineffective (due to possible synchronous garble) and more likely to generate interference with the SSR radars. Accordingly, the active detection system is preferably totally disabled in this case. Fortunately, this is also the environment in which the passive detection system is typically most reliable.

Since, as outlined above, the active interrogator of the present invention would either be used at a reduced rate, or preferably not be used at all in areas of increasingly higher traffic density, there presently is no perceived need to restrict its power level to less than that required to obtain reliable interrogation of all transponders detected by Own's 1090 MHz receiver within the range determined to be of interest. This insures reliable detection of intruders in Cases 1 and 2 above (the no-radar or one-radar case), and reliable elimination of possible unwanted alarms due to poor "pseudo-range" in Cases 1 and 2 (wherein there are one, two or three radars).

In an alternate embodiment, the transmission power of the active interrogator of the present invention may be varied in an inverse manner to the number of SSR stations interrogating Own station's airspace, or with respect to the traffic density of its airspace, or both, to minimize the risk of interfering with other ATC systems.

The active detection system of the present invention may use the same intruder detection logic as the passive system, but need not do so if different processing proves desirable. The same intruder detection logic may be utilized by allowing Other's replies to the 1030 MHz interrogations from Own to be processed as though they were generated in response to interrogations from SSR ground radar. This provides a simple and automatic means of combining the information from the passive and active detection systems.

Other objects, features and advantages of the present invention will become apparent from the subsequent description and the appended claims taken in conjunction with the accompanying drawings.

DETAILED DESCRIPTION OF THE PREFERRED EMBODIMENTS

Figure 1A:
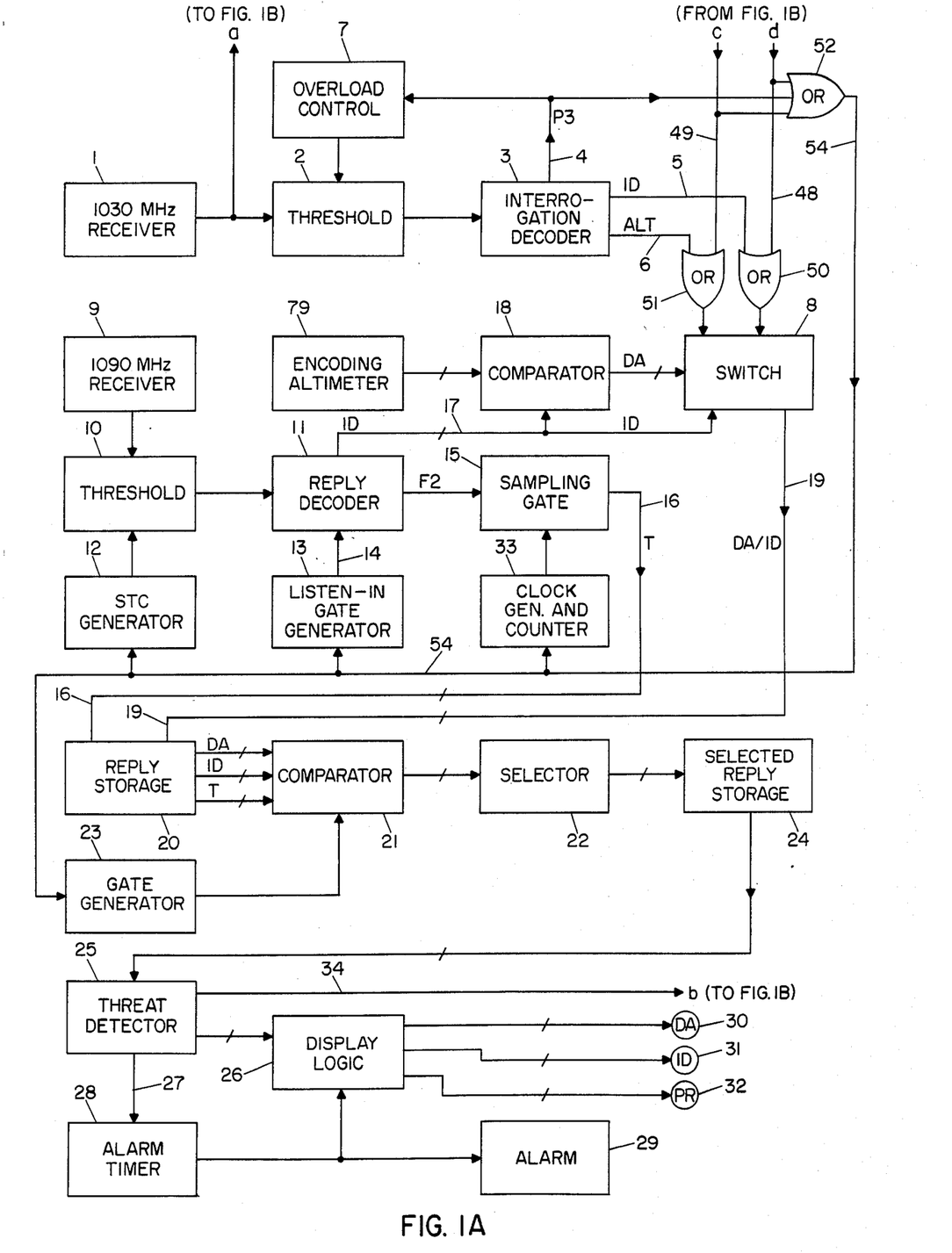
FIG. 1A is a block diagram of the equipment primarily used by the passive system at an Own station in a presently preferred embodiment of the invention.
Figure 1B:
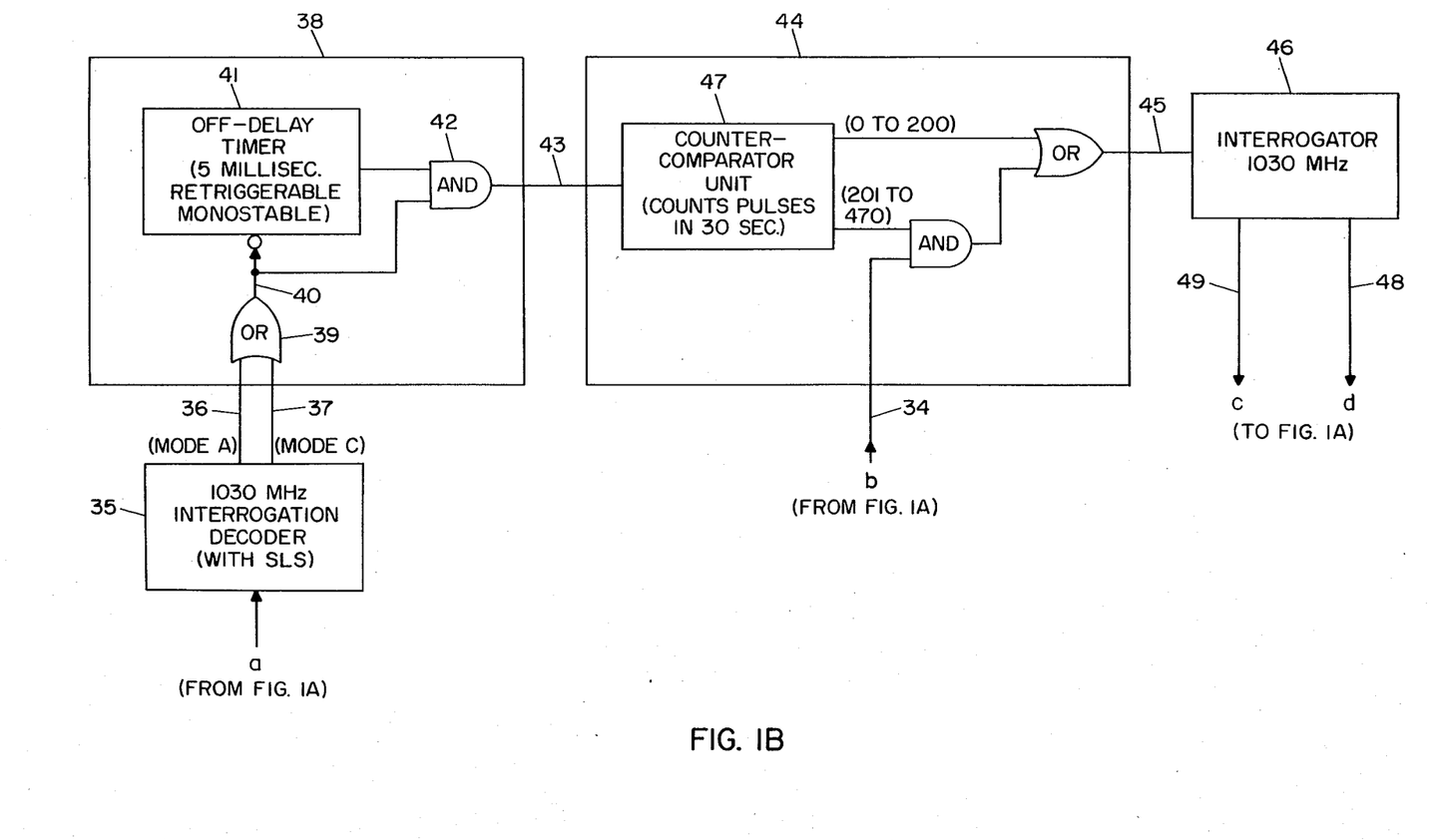
FIG. 1B is a block diagram of the equipment used by the active system at an Own station in a preferred embodiment of the present invention.

FIGS. 1A and 1B, when viewed together, illustrate a preferred embodiment of the above-described passive/active proximity warning system. In reading the following detailed description of this preferred embodiment, it is to be understood the practice of the present invention is not limited to the exact system described herein. Rather, the concepts of the present invention may be implemented in alternative embodiments without departing significantly from the teachings of the present invention. The FIG. 1 embodiment is described in the following paragraphs in detail. Items identified by reference numerals 1 through 33 and 79 on FIG. 1A are the same as shown and described in the parent patent application, and generally constitute the "passive system portion" of the over-all system. (Line 54 in FIG. 1A is shown as part of line 4 in the parent application.) Items identified by reference numerals 34 through 52 are the additions required to provide the "active system portion" of the over-all system.

Referring to FIG. 1A, a receiver 1 is designed to receive standard SSR interrogations. It may be similar to the usual transponder receiver but about 20 db more sensitive. The output of receiver 1 is applied to a threshold device 2 arranged to pass any output from receiver 1 exceeding the threshold level to an interrogation decoder 3. Decoder 3 provides an output on line 4 representing the P3 pulse of each received and decoded interrogation. Line 4 goes to an overload control circuit 7 arranged to control the threshold level of device 2, as in a standard SSR transponder. Line 4 also goes to an OR gate 52, whose output is line 54.

Decoder 3 is designed to provide an output on line 5 when an identity (mode A) interrogation is received or an output on line 6 when an altitude (mode C) interrogation is received. These outputs are applied as control inputs to a switch circuit 8.

A receiver 9, designed to receive standard transponder reply signals, is connected by way of a threshold device 10 to a reply decoder 11. The threshold device 10 is similar to the device 2, but its threshold level is controlled by a sensitivity time control (STC) generator 12. STC generator 12 is controlled by P3 pulses on line 54 to initially provide a relatively high threshold level, and then reduce the level over a period of, say 5 microseconds, thereafter maintaining the lower level until the next P3 pulse occurs.

A "listen-in" gate generator 13 is connected to line 4 and arranged to produce a gate signal of about 200 microseconds duration following each P3 pulse. The gate signal on line 14 enables reply decoder 11, which in the absence of the gate signal is disabled. When enabled, decoder 11 produces an output pulse corresponding to the final framing pulse F2 of any reply passing the threshold device 10. The F2 output of decoder 11 goes to sampling gate 15.

A clock generator and counter 33 is arranged to be reset by each P3 pulse on line 54, and to apply the current count, which may be a numerical representation of the number of microseconds elapsed since the last preceding P3 pulse, to gate 15. Each F2 pulse applied to gate 15 transfers the current count to line 16. The output of gate 15 on line 16 represents the differential time of arrival T of a received interrogation and the corresponding received reply from a transponder at an Other station.

The reply decoder produces an output on line 17 representing either the identity or the altitude information contained in the current reply message. This output is applied to an altitude comparator 18 and to switch circuit 8. An encoding altimeter 79 provides a representation of Own's altitude encoded in similar format. Comparator 18 produces an output representing the difference between Own's and Other's altitudes when a mode C reply occurs. The output of comparator 18 in response to a mode A reply will be spurious. In either case the output of comparator 18 is an information input to switch circuit 8.

Multiple line 17 is connected to supply all decoded outputs, both altitude and identity, from decoder 11 as information inputs to switch circuit 8. When an identity interrogation is received, line 5 is energized to actuate switch 8 to pass the identity message to switch output line 19. The output of comparator 18 at this time is discarded. When an altitude interrogation message is received, decoder 3 energizes line 6, thereby actuating switch circuit 8 to apply the output of comparator 18 to line 19, discarding the input from line 17.

Lines 16 and 19 go to a reply storage device 20, which may comprise a plurality of digital registers arranged in known manner to store associatively the T and identity or differential altitude information corresponding to approximately 20 successive reply messages. Preferably, the differential altitude is stored associatively with the identity and differential time of arrival data. The information contained in each new reply message displaces the oldest such stored information, so the storage device 20 maintains a running account of identification and associated T and differential altitude information.

A comparator 21, when enabled, compares the associated entries in storage device 20 with each other to select those nearly identical entries that appear currently in the reply storage device 20. When such a match occurs the respective entry is transferred to a selector device 22. A gate generator 23, similar to the listen-in gate generator 13, is arranged to enable the comparator 21 for a period beginning at the end of the listen-in gate and enduring long enough for completion of the operation of comparator 21.

The output of comparator 21 may, and generally will, include several entries containing the same identity information but substantially different T information. The selector 22 rejects all such entries except the one containing the largest T, which it transfers, together with the associated identity and differential altitude information, to a selected reply storage device 24. Storage device 24 is similar to device 20, but retains its entries for a period somewhat longer than the longest radar beam rotation period to be expected, say 15 seconds. If during that time a new entry with a larger value of T is presented, the new larger value of T is substituted for the old, smaller value associated with that particular identity. A new entry with a different differential altitude will also substitute the new differential altitude value for the former value.

The storage device 24 is connected to a threat detector 25. Detector 25 is designed to transfer any entry containing a differential altitude of less than 3000 feet and a T less than 36 microseconds to a display logic device 26. At the same time detector 25 provides an output on line 27 to start an alarm timer circuit 28 which may be similar to the listen-in gate generator 13, but designed to provide an output lasting, for example, about 10 seconds. The output of time 28 enables display logic device 26 and actuates an alarm device 29.

The display logic device 26 converts the output of detector 25 to a form suitable for display on a differential altitude indicator 30, an identity indicator 31 and a psuedo range indicator 32. The psuedo range indication is a display of the differential time of arrival T in terms of distance. Radio Technical Commission For Aeronautics (RTCA) Paper No. 341-82/SC147-101 from December, 1982 entitled "Passive Time of Arrival Applications for TCAS-I" shows and discusses (see FIG. 10 therein) one possible physical arrangement of the indicators 30, 31 and 32 driven by display logic device 26.

Figure 3:
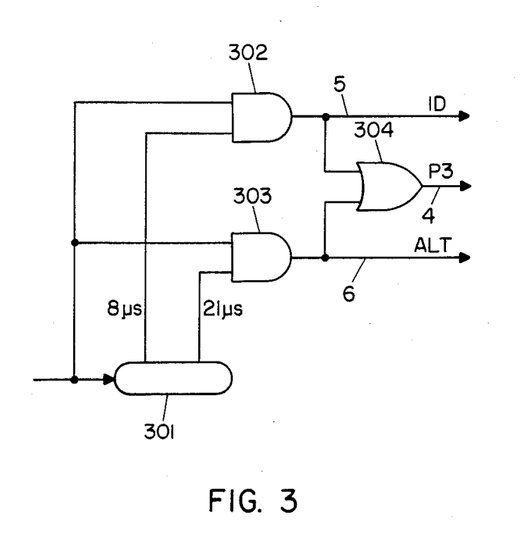
FIG. 3 is a schematic diagram of an interrogation decoder in the apparatus of FIG. 1.

Referring to FIG. 3, the interrogation decoder 3 of FIG. 1 consists of a delay line 301, AND gates 302 and 303, and OR gate 304, connected as shown. Delay line 301 is tapped to provide delays of 8 microseconds and 21 microseconds, corresponding to the delays by which the P3 pulse follows the P1 pulse in mode A and mode C interrogations respectively.

The circuit of FIG. 3 is similar to, and operates in substantially the same manner as, the interrogation decoder of a standard transponder, with the exception that no provision is made for decoding the side lobe suppression (SLS) P2 pulse, since SLS is not used in the system of FIG. 1. In this connection it is noted that the receiver 1 of FIG. 1 may form part of a transponder at Own station, by providing an additional threshold device set approximately 20 db higher than the device 2 of FIG. 1 and connected to an interrogation decoder of the usual type with SLS, such as decoder 35, discussed later.

Figure 4:
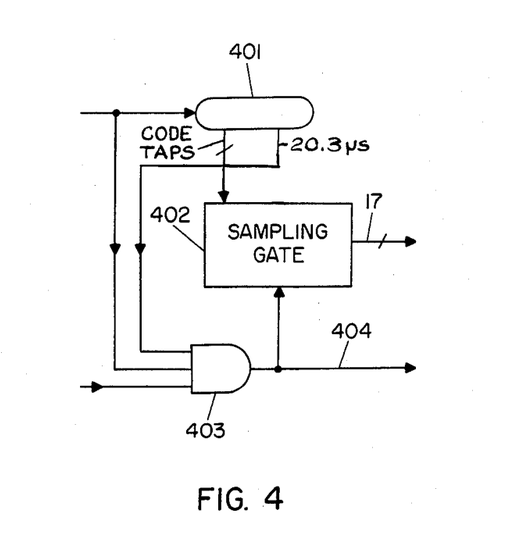
FIG. 4 is a schematic diagram of a reply deocoder in the apparatus of FIG. 1.

Referring to FIG. 4, the reply decoder 11 of FIG. 1 comprises a multiple tapped delay line 401, a sampling gate 402, and an AND gate 403, connected as shown. The foregoing elements and their interconnections may be the same as those in the reply decoder of the usual ground based SSR, with the addition of an input to gate 403 on line 14. While enabled by a listen-in gate signal on line 14 the circuit produces an output on multiple line 17 numerically representing currently received Others reply message, and outputs the final framing pulse F2 on line 404.

In the operation of the system of FIG. 1, interrogation messages reach decoder 3 not only during, but also before and after passage of the main beam of an SSR through Own's location, owing to the relatively high sensitivity of receiver 1, the relatively low threshold of device 2 and the omission of SLS beams, which combine to provide response to primary and reflected side lobes as well as the main beam. As a result, the advantages of widened azimuth sector operation, as described in U.S. Pat. No. 3,735,408, are obtained without requiring the additional equipment described therein.

When Own station is relatively near an SSR, many of the received side lobes will be strong enough to pass the threshold 2, providing operation of the system throughout a relatively large angular sector, thus allowing comparison with replies from Other stations within a range of several miles from Own. When Own station is more distant from the SSR the weaker side lobes are not passed by the threshold 2, effectively narrowing the angular extent of the monitored azimuth sector. Finally, when Own station is remote from the SSR, none of the side lobes pass the threshold and the monitored sector is the same as the width of the main beam. The automatic narrowing of the azimuth sector with increasing distance from the SSR maintains the geographic width of the monitored area more or less constant at several miles, thereby eliminating response of the system to transmissions from Others outside said area.

Figure 2:
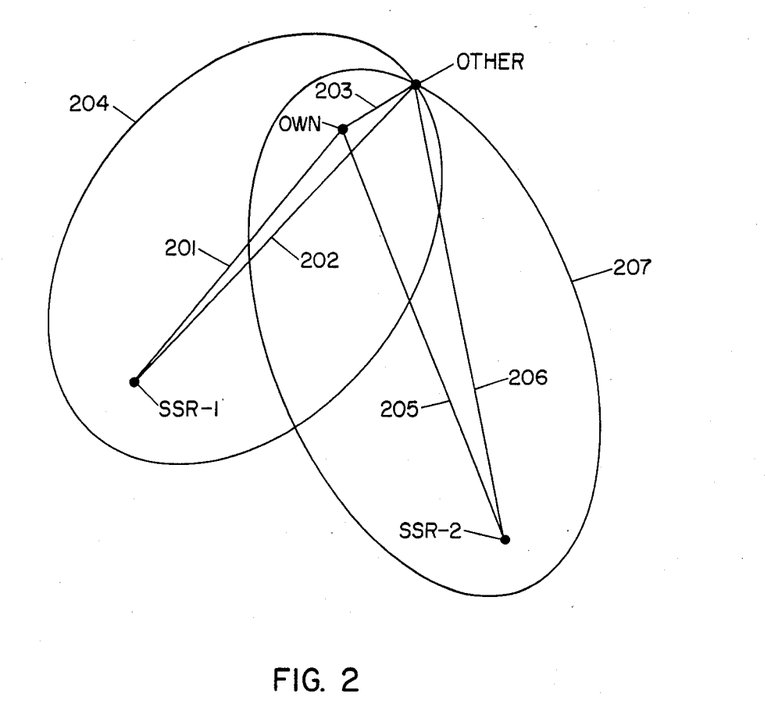
FIG. 2 is a geometric diagram used in the explanation of the operation of the system of FIG. 1 with two favorably located SSRs.

Referring to FIG. 2, which is a plan or map-like representation, an Own, an Other and two SSRs are located as shown. Line 201 represents the distance from SSR-1 to Own, line 202 represents the distance from SSR-1 to Other, and line 203 represenfts the range between Own and Other. The differential time of arrival T1 in this case is the difference between the sum of the travel times over paths 202 and 203 and the travel time over path 201, generally expressed in microseconds. Any particular time T1 defines an ellipse such as 204, which is a locus of Other's position, i.e., time T1 signifies only that Other is at some unspecified point on ellipse 204.

It will be seen in FIG. 2 that lines 201 and 202 are approximately parallel and thus T1 is very nearly twice the propagation delay along line 203, the true range between Own and Other. Thus (cT1)/2, referred to herein as the psuedo range associated with SSR-1, is essentially equal to the true range, where c is the propagation speed.

Line 205 represents the distance from SSR2 to Other. In this case the differential time of arrival T2 defines ellipse 207 as a locus of Other's position. Owing to the positional relationship between Own, Other and SSR2 the psuedo range associated with SSR-2, that is (cT2)/2, is considerably less than the true range, and may be shown to be a little more than one-half the true range. Regardless of the relative positions of Own and any Other station and any SSR, a psuedo range associated with any given SSR can never be greater than the true range and generally will be somewhat less. Therefore, in a multiple SSR environment the largest determined psuedo range to a particular Other is always selected as the value most nearly equal to the true range.

When an Other station is much closer to the SSR than Own station the psuedo range may become a small fraction of the true range and, if the Other is within the differential altitude limits, may initiate a threat detection when in fact no threat exists. Such false threats are minimized by the action of the STC generator 12 of FIG. 1 controlling the threshold device 10 to reject relatively weak replies received within a few microseconds after reception of an interrogation.

Prior to discussing details of the active system portion of the invention shown in FIG. 1B, it is useful to explain how a count of interrogations detected by a 1030 MHz receiver at Own station may be used to determine how many SSRs are interrogating Own station. By counting the interrogations Own station receives from SSR ground radars over a period of time which is long compared to the rotational period of the SSR ground radar antennas, a reasonably accurate count of SSR stations may be obtained. It has been determined that, on the average, most SSR ground radars interrogate each aircraft about 3 to 5 times per second averaged over two or more rotational periods of the radar. Accordingly, the different SSR environments to be sensed, namely Cases 1 through 4 discussed above, may be distinguished by monitoring the "SSR interrogation rate" detected by Own station. For example, in one embodiment of the present invention, the scheme of count values shown in Table A may be used to distinguish the number of SSRs interrogating the airspace of Own station.

TABLE A

| CASE NO. | NUMBER OF SSRs | AVERAGE NO. OF INTERROGATIONS PER SECOND | AVERAGE NO. OF INTERROGATIONS PER 30 SECs. |
|---|---|---|---|
| 1 | 0 | 0 to 2 | 0 to 80 |
| 2 | 1 | 3 to 6 | 81 to 200 |
| 3 | 2 or 3 | 7 to 15 | 201 to 470 |
| 4 | 4 or more | 16 or more | 471 to more |

Adjustment of the foregoing count values (or of other engineering values mentioned throughout the application) is deemed to be within the scope of the present invention. Such adjustments or "fine tuning" may, for example, be based upon field experience with integrated active/passive systems embodying the present invention, and in no way conflict with the teachings herein.

It is also to be appreciated that the number of SSRs associated with each of the above-identified Cases (that is, distinct control modes) is subject to similar adjustment. For example, one embodiment of the present invention may categorize the number of SSRs in the environment into the Cases shown in Table B.

TABLE B

| CASE NO. | NUMBER OF SSRs |
|---|---|
| 1 | 0 |
| 2 | 1 or 2 |
| 3 | 3 or 4 |
| 4 | 5 or more |

Another embodiment of the present invention which does not use a Case 4 control mode but rather uses only three control modes may categorize the SSR environment into the Cases shown in Table C.

TABLE C

| CASE NO. | NUMBER OF SSRs |
|---|---|
| 1 | 0 or 1 |
| 2 | 2 or 3 |
| 3 | 4 or more |
| 4 | Cases Not Used |

It is useful to note once again that each of the Cases set forth in Table A may (but does not have to) correspond to a separate control mode for the active system of the present invention. It should also be understood that each distinct Case set forth above may have a distinct transmission rate for the 1030 MHz interrogations sent out from Own station. In this regard, Case 4 is considered to have a "zero" transmission rate, while, the Case 3 practice of transmitting interrogations from Own station only when a potential threat is detected may be considered, for all purposes herein, as a very low non-zero transmission rate, even when only one set of interrogations may be transmitted over a long and indeterminate length of time.

The count of interrogations per unit time used to determine the mode of operation of the active system of the present invention should not include interrogations from other airborne active detection systems. If this is not insured, it is possible that the number of such interrogations (for example in the vicinity of a busy small airport that is outside of SSR ground radar coverage) might be sufficient to cause one or more of the aircraft to stop interrogating, thus denying them protection. Interrogations from ground radars can be distinguished, for example, by the fact that they occur in bursts at the pulse repetition frequency (PRF) of the radar, whereas repetitive airborne interrogations occur (or can be mandated by appropriate regulations to occur) at longer intervals. Within the present ICAO or ATCRBS radar systems, it would be reasonable to count any interrogation which occurred within five milliseconds after another interrogation as coming from an SSR ground radar.

Turning to FIG. 1B, block 35 shown therein is an interrogation decoder, preferably of the standard ICAO-Annex 10 type (which includes SLS) such as would be used in any transponder to trigger that station's replies. It preferably operates at the standard sensitivity specified in the ICAO-Annex 10 Standard and includes side lobe suppression. The output from decoder 35 is comprised of two trigger lines, with a signal on trigger line 36 indicating a mode A interrogation, and a signal on trigger line 37 indicating a mode C interrogation. If the proximity warning system of the present invention is combined with a transponder (as would likely be done when mass-produced), decoder 35 could be the same decoder used to trigger the transponder replies.

Radar beam detector 38, which is preferably a simple timing and logic circuit, operates as described above to reject (most) interrogations from other active proximity warning systems or active collision avoidance systems. OR gate 39 combines trigger signals 36 and 37 into a single trigger signal on line 40, which is gated by an off-delay timer 41 and AND gate 42 to generate a radar interrogation received signal on line 43 whenever an interrogation is received within a predetermined time interval (such as 5 milliseconds) after a preceding interrogation has been received. Since the pulse repetition period of virtually any SSR ground radar is less than the above time interval, all of the interrogations received from an SSR ground radar (except the first one in a given beam passage) will be included in the radar interrogation received signal 43. Interrogators in airborne proximity warning systems and collision avoidance systems, on the other hand, which have (or could be mandated by regulation to have) a much longer time between consecutive interrogations, will not be included in signal 43.

Block 44 may conveniently be called the radar environment detector and mode logic controller. Block 44 contains that portion of the equipment which assesses, that is, classifies, the SSR environment and selects the appropriate control mode for the operation of the active system. It receives two inputs: the radar interrogation received signal 43 described above, and a pre-alarm warning signal 34 from threat detector 25. Output line 45 of block 40 conducts an enable interrogation signal to a 1030 MHz interrogator 46. The radar interrogation received signals on line 43 are counted in a counter within counter-comparator unit 47. The output of the counter is sampled and then the counter is reset at predetermined intervals long in comparison to the rotational period of ground radars, such as thirty seconds. A suitable implementation for a counter-comparator device like unit 47 is shown and discussed in U.S. Pat. No. 3,875,570 (see FIG. 1 therein). If unit 47 determines last sampled count value is less than a predetermined low threshold, such as 201 counts in 30 seconds, the airspace or environment of Own station is declared to contain zero or one usable radars and the enable interrogation signal 45 is turned on. If the last sampled count value is above a predetermined high threshold, such as 470 counts in 30 seconds, Own's airspace is declared to contain four or more radars and the enable interrogation signal 45 is turned off. If the last sampled count value is between these two thresholds, Own's airspace is declared to contain two or three radars and the pre-alarm warning signal 34 described below is used to control the enable interrogation signal 45.

Pre-alarm warning 34 is an added output from threat detector 25 described in conjunction with FIG. 1A. Output 34 is also sometimes called the potential threat output. As previously described, alarm signal 27 is generated whenever a particular intruder's identity (and altitude) has remained in selected reply storage table 24 for a time (such as 15 seconds) greater than the rotational period of the slowest ground radar. Pre-alarm warning signal 34 is generated when an intruder has remained in table 24 for a slightly shorter time, such as 14.5 seconds. This interval is chosen to allow time for a set or round of interrogations to be transmitted by Own's interrogator 46 and for the replies thereto from Other stations, especially intruder, to be processed before alarm signal 27 is generated. If the replies elicited by Own's interrogation cause the intruder to be removed from table 24, no alarm will be generated.

Block 46 is an ATCRBS (or equivalent ICAO) interrogator operating at 1030 MHz and capable of transmitting both mode A and mode C interrogations. When it is enabled by enable interrogation signal 45, it will immediately transmit a set or round of interrogations, comprised of one or more pairs (preferably three to five pairs) of mode A and mode C interrogations. The time between individual interrogations in the set should typically be between about 20 to 30 milliseconds, although field experience may dictate a larger or smaller average pulse repetition period (PRP) should be used. As long as the enable interrogation signal 45 thereafter remains present, interrogator 42 will transmit a set of interrogations at predetermined intervals of time which preferably average out to be about one set of interrogations every four seconds. This nominal interrogation transmission rate should provide coverage as timely as that provided by the passive system alone when operating in an airspace covered by a single airport SSR. Field experience may show that a larger or smaller transmission rate should be utilized.

Each time interrogator 46 transmits a mode A interrogation, it also generates an output on line 48. Similarly, interrogator 46 produces an output on line 49 for each mode C interrogation it transmits. OR gates 50 and 51 respectively allow outputs 48 and 49 to serve as control inputs to switch circuit 8 in the same manner that outputs 5 and 6 from decoder 3 do. OR gate 52 similarly allows outputs 48 and 49 to mimic or duplicate the function of the P3 pulses imposed on line 54 via line 4. This in turn allows 1090 MHz replies from nearby Other stations generated in response to interrogations from interrogator 46 to be processed as though they were replies generated in response to interrogations from SSR ground stations.

It is to be appreciated that the apparatus of FIG. 1A produces from received 1090 MHz reply messages transmitted by Other stations in response to 1030 MHz interrogation messages from Own station during a predetermined period following transmission of each said interrogation message from Own station, a direct time of arrival value for each of said Other stations with respect to Own station. These direct time of arrival values are proportional to the respective slant ranges between Own station and the Other stations. Slant range may be readily calculated from a direct time of arrival value (after subtracting known system delays therefrom) by multiplying it by one-half the propagation speed. Those skilled in the art should appreciate that the direct time of arrival values produced by the passive system equipment of FIG. 1A are directly comparable with the differential time of arrival values produced therein. This compatibility between the two types of time of arrival values, and the simple and very inexpensive manner in which they are integrated into the FIG. 1 apparatus, is a signigicant advantage of the present invention. It allows direct time of arrival values to be produced and utilized by existing equipment within the passive system, thereby avoiding the added cost and complexity associated with separately processing replies from Other stations in response to Own's interrogations.

In the preferred embodiment of the active system, the PRPs within each set of interrogations and the intervals between sets of interrogations produced by interrogator 46 may both be randomly varied within finite predetermined limits about their average or nominal value. This provides an important advantage in an airspace having a plurality of ATC systems having 1030 MHz interrogators (whether airborne, ground-based, or both) in that it helps minimize interference to and from such systems. Specifically, it reduces the possibility of interrogations from Own station (and replies in response thereto) being synchronized or nearly synchronized with interrogations from other interrogators (and replies in response thereto). Even in airspace having higher SSR densities or higher traffic densities where interrogation overlap and/or reply overlap are most likely to occur, most of Own's interrogations are expected to be in the clear. This follows from the fact that randomizing consecutive PRPs within each set of interrogations emanating from Own station reduces the possibility that more than one or two individual interrogations in a set of interrogations from Own station will overlap and clutter up interrogations from any other source, even when completely interleaved among the interrogations from another source. Further, the randomization of the interval between consecutive sets of interrogations helps assure that such an interleaved condition will not be repeated, as might occasionally be the case without such randomization. Finally, the above-described randomization will even help minimize interrogation overlap in an airspace where a fairly large number of active systems (even if identical in design to that of the present invention) are all interrogating. This in turn helps reduce the incidence of overlap at any given 1090 MHz receiver listening to replies from transponders triggered by different interrogators.

Those skilled in the art will appreciate that randomization of the type just described may be accomplished in several ways, such using a conventional pseudo-random generator circuit, or a conventional computer-implemented subroutine for generating random numbers. Devices or subroutines which mimic randomness over short intervals, but which are actually repetitive if viewed over a sufficiently long interval, such as a table of random values, are also suitable for randomizing the transmission rate or PRP of interrogator 46.

The relatively low interrogation transmission rate from Own station also provides an advantage in that relatively few individual interrogations in a set from Own station can possibly be received at an Other station in an interleaved condition with a main beam burst from an SSR station, which typically lasts about one-twentieth second (for airport SSRs) or about one-ninth second (for enroute SSRs).

In anything but very low density SSR and/or traffic environments, it has been predicted that relatively high power (e.g., from about 20 watts on up) continuous 1030 MHz transmissions by airborne interrogators transmitted omni-directionally will produce unacceptably high levels of synchronous garble and interference with other ATC systems. It is believed that the preferred embodiment of the present invention described above overcomes this problem by reducing Own station's interrogation transmission rate as SSR density increases, and by stopping all interrogations when the SSR density is high enough to ensure reliable operation using only the passive detection system. Nevertheless, should the use of a fixed power interrogator in the present invention under certain detectable conditions cause any unacceptable interference problems, the following alternative embodiment of the present invention may be used to reduce such problems to managable levels.

In an alternative embodiment of the present invention, interrogator 46 in the active system of the present invention automatically varies its transmission power in a roughly inverse manner to the SSR density covering Own station's airspace. Specifically, radiated transmission power may vary between a maximum value (preferably somewhere between about 50 and 100 watts) required to achieve acceptable confidence levels of coverage (say 90 to 95 percent) at the outer limits of the monitored airspace, and a minimum value required to achieve acceptable confidence levels of coverage of an airspace somewhat larger in size than that protected volume of space about Own station in which a threat alert would be produced if an intruder is detected therein. Equipment and techniques for varying transmission power in response to either digital or analog signals are well-known and need not be discussed here. Accumulated count values in counter-comparator unit 47, after conventional signal conditioning, are preferably used as either an analog input signal or one or more digital input signals (not shown) to interrogator 46 to indicate the number of SSRs covering Own station's airspace. Equipment and techniques for determining the number of SSR stations interrogating Own station, as well as the number of Other stations within the monitored airspace about Own station, are disclosed in U.S. Pat. No. 3,875,570. (See, e.g., FIGS. 1 and 2 therein and the discussion related thereto.) Accordingly, in still another embodiment of the present invention, the transmission power of interrogator 46 may also be varied in roughly inverse manner to the traffic density surrounding Own's station airspace. This embodiment would preferably be used if unacceptable levels of synchronous garble and/or other interference produced by active systems is shown to be substantially dependent upon traffic density. In a further embodiment of the present invention, transmission power of interrogator 46 could be varied as a function of SSR density and traffic density.

In the present invention, it is believed that passive detection system alone in a Case 4 situation (e.g., preferably 4 or more SSRs) will provide in almost all circumstances reliable threat detection with an acceptable, but very minimal, level of false alarms (if any). In any type of on-board proximity warning system, having no more than a minimal percentage of false alarms is deemed fairly essential because a pilot cannot reasonably be expected to give undivided attention to a proximity warning system that frequently provides false alarms. In a Case 4 situation, the passive detection portion of the present invention may occasionally provide a threat alert under circumstances where a threat alert would not have been provided in a Case 1, 2 or 3 situation. For example, consider the Case 4 situation where the differential altitude and the largest T value (i.e., largest pseudo range) of a given Other station are both within the prescribed threat limits, but the Other station is actually outside the true range distance that ideally defines when a threat exists. A set or round of interrogations from Own would reveal this, provided that synchronous garble or other interference capable of jamming Other's replies was not present. In the FIG. 1 embodiment of the present invention, such a round of interrogations is not utilized in this situation in order to eliminate the likelihood of interfering with other ATC systems. But, if field tests show that interference with other ATC systems will remain within acceptable limits, it would be desirable in higher density SSR environments (e.g., where SSR density exceeds three) to use a set of interrogations from Own to attempt to confirm or negate the range of any threat identified by purely passive detection techniques. In such an embodiment of the present invention, interrogator 46 would never be totally disabled. Such an embodiment would minimally have a plurality of control modes, the first of which would correspond to an active interrogation transmission rate (e.g., a set of interrogations once every four seconds), and the second of which would correspond to a "transmission rate" of one set of interrogations produced every time a potential threat is identified by passive detection (i.e., differential time of arrival) techniques.

It is possible that interference with other ATC systems will be found to be within acceptable limits in environments of Own station having multiple SSRs only under certain specified conditions. Such conditions would likely include: (1) the sensed number of Others within a given airspace monitored by Own being below a predetermined value (below, for example, four, six or eight Others), or (2) Own station, upon detecting a continuing potential threat, being allowed to transmit a set of interrogations at a very low transmission rate, such as, for example, once every 12 seconds or once every 15 seconds. One or both of such constraints, when imposed upon an active system of the type shown in FIG. 1B, constitute three more embodiments of the present invention.

Prior to describing other advantages of the present invention, it is useful to touch upon the problem of synchronous garbling and explain the term "interleaved replies" as used herein. Synchronous garbling typically occurs when the replies from two or more Other stations in response to Own's interrogations are received by Own station at substantially the same time such that the replies overlap at least partially. Since each reply comprises a timed and serially transmitted train of 1090 MHz pulses of approximately one-half microsecond duration per pulse digitally encoded with identity or altitude information, overlapping replies cannot be accurately and reliably decoded because their individual pulses are mixed together. The duration of each reply is approximately equal to the time between its framing (F1—F2) pulses, which is 20.3 microseconds. At the propagation speed c, this reply duration period represents a distance of about 3½ nautical miles (NM). Accordingly, synchronous garbling will predictably occur when the Other stations are within plus or minus one-half of the distance associated with the reply duration period. Thus, for example, an Other station about 1.75 NM from Own will theoretically garble all replies within a sphere of about 7 NM in diameter centered about Own station. As a second example, garbling will occur between the replies from a first Other 7.0 NM straight ahead of and slightly above Own and a second Other 8.0 NM behind and slightly below Own.

Interleaved replies, for all purposes herein, may be defined as replies from two or Other stations generated in response to interrogations transmitted by an SSR ground station or by Own station which arrive at Own station within a single listen-in period (e.g., that period produced by gate generator 18 in FIG. 1A) which are not partially overlapped by any other reply.

Two very significant advantages of the active/passive warning system of the present invention over purely active detection systems which employ only active detection techniques (i.e., interrogations from Own station to determine whether Other stations constitute a threat) are the manner in which it responds to interleaved replies, and the manner in it responds in environments having one or more SSRs to synchronously garbled replies to its own interrogations.

These two advantages may be illustrated by way of the following example wherein two or more transponder-equipped Others are in the vicinity of Own. In this example, further assume that the first Other is at Own's altitude on an apparent collision course, while subsequent Others are harmlessly above or below Own at substantially different altitudes and spaced apart sufficiently to avoid synchronously garbling one another's replies generated in response to Own's interrogations. In this example, it would be rather unlikely that all nearby aircraft would also be interrogated simultaneously by a single SSR. Thus, even with a single SSR, the passive warning system of the present invention should almost always be able to identify first Other as a threat, given a sufficient number of distinct, nongarbled replies from first Other. Any additional SSRs interrogating Own's airspace would only serve to increase the already high probability of this result, and would likely improve the accuracy of the pseudo-ranging. In this regard, those skilled in the art should appreciate that the passive system when provided with sufficient reply storage capacity will process interleaved replies from different Other stations with no appreciable degradation in performance. Accordingly, replies from Others in the vicinity of Own that are merely interleaved do not present a problem. Also, even where most of the replies in a beam burst are synchronously garbled, this should not present a problem, since only a relatively small number of nongarbled replies need be received for the passive detection system to work. These same benefits apply to the processing of replies received in response to Own's interrogations. Hence, if a sufficient number of replies from first Other manage to come through in spite of any interference generated by subsequent Others responding to interrogations from other ATC systems besides Own or by alternate sources, the system of the present invention will faithfully obtain a true slant range for first Other via direct time of arrival techniques. Garbled replies, on the other hand, are preferably ignored by the passive system as unprocessible before they ever reach selected reply storage 24. Thus, if too many replies from first Other sent in response to Own's interrogations are garbled, the potential threat alert generated by passive detection techniques will not be cancelled, and Own's pilot will be properly alerted about the threat very shortly thereafter. The integrated system of the present invention preferably does not allow garbled replies received in response to Own's interrogations or otherwise to cancel a potential threat already detected. Only a sufficient number of nongarbled replies are allowed to do so.

If, in the foregoing example, first Other and any subsequent Other are within such ranges of Own to cause first Other's replies to be synchronously garbled, active interrogations from Own would not affect the threat alert produced by the passive detection system alone, since garbled replies are effectively ignored. In summary, then, the combined active/passive system of the present invention may be said to selectively use interrogations from Own to supplement and improve upon the performance of its passive detection equipment without degrading that performance.

Alternative techniques and/or equipment may be used to implement various facets of the present invention. For example, one or more microcomputers or microprocessors might be used, and preferably would be used if economically or otherwise advantageous, to handle any or all functions described above which could be digitally performed at real time speeds, i.e., quickly enough to keep up with the maximum projected information flow through those parts of the warning system that are based around a microcomputer or microprocessor. Microcomputer or microprocessor based implementation of more complex signal or information processing systems than that described herein is believed within the grasp of those of ordinary skill in the art, and accordingly, computer implementation of the present invention is believed to be within the fair scope of the subjoined claims. Of course, an implementation based upon older technologies, such as (but not necessarily limited to) assemblies of a fair number of discrete components including individual IC logic chips, is also believed to be within the scope of the subjoined claims.

A ready example of specific aspect of the preferred embodiment of the present invention which could be implemented in alternative ways is the determination of the number of SSRs interrogating Own's station. Instead of detecting and counting mode A and mode C interrogations, each SSR may be identified by one or more of its unique pulse repetition characteristics as described in U.S. Pat. No. 4,021,802, and then the number of such uniquely identified SSRs may be counted. This technique, while potentially more accurate, requires considerably more complex signal processing than that disclosed in the preferred embodiment shown in FIG. 1B. A second alternative approach for determining the number of SSRs is simply to count the number of SSR beams interrogating Own station during a sufficiently long time period (e.g., one or more time periods of the longest expected beam rotation period). Such a technique, although simpler, does not take into account the substantial variations in beam rotation periods among SSRs and therefore would not typically be as accurate as the scheme associated with in FIG. 1B.

While there has been described what is believed to be the preferred embodiment of the present invention and a few alternative embodiments relating to various aspects thereof, those skilled in the art will recognize that other changes and modifications may be made to these embodiments without departing from the spirit of the invention, and it is intended to claim all such embodiments and changes as fall within the true scope of the present invention.

We claim:

1. A proximity warning system for an Own station, comprising:
    (a) means for selectively enabling the production and transmission of interrogation messages at Own station at least in part in response to the SSR environment sensed at Own station;
    (b) means for producing from received interrogation messages transmitted by SSRs within operational range of said Own station and received reply messages transmitted by transponder-equipped Other stations in response to said SSR interrogation messages during a predetermined period following reception of each said interrogation message at Own station, a differential time of arrival value for each of said Other stations with respect to each of said SSRs;
    (c) means for producing from received reply messages transmitted by said Other stations in response to said interrogation messages from Own station during a predetermined period following transmission of each said interrogation message from Own station, a direct time of arrival value for each of said Other stations with respect to Own station;
    (d) means for selecting from among the several most recent time of arrival values produced by means (b) if any and by means (c) if any, the largest time of arrival value associated with each of said Other stations that has been substantially duplicated a predetermined number of times; and
    (e) means for producing a threat alert output in response to any time of arrival value selected by means (d) that is below a predetermined value.

2. The system set forth in claim 1 further comprising:
    (f) means responsive to an altimeter at Own station and to said received reply messages containing altitude information for producing a differential altitude value for each said identified Other station with respect to Own station; and
    (g) means for preventing means (e) from producing said threat alert output in response to time of arrival values associated with any of said Other stations whose differential altitude values are greater than a predetermined amount.

3. The system set forth in claim 2 further comprising:
alarm device means for producing a threat alert in response to said threat alert output.

4. The system set forth in claim 3 wherein:
means (a) includes a 1030 MHz interrogator; and
means (b) includes a 1030 MHz receiver and a 1090 MHz receiver.

5. The system set forth in claims 1 or 2, further comprising:
    means for automatically varying the time between transmissions of said interrogation messages produced at Own station at least in part in response to the SSR environment sensed at Own station, wherein said time generally increases as the number of SSRs in the environment at Own station increases.

6. The system set forth in claim 5, further comprising:
    means for randomly varying said time between transmissions about a nominal value within finite predetermined limits to help minimize interference to and from other ATC systems.

7. The system set forth in claims 1 or 2, further comprising:
    means for randomly varying the time between transmissions of said interrogation messages produced at Own station about a nominal value within finite predetermined limits to help minimize interference to and from other ATC systems.

8. The system set forth in claims 1 or 2, wherein means (a) selectively enables the production and transmission of interrogation messages in one or more sets, and wherein the nominal time between consecutive interrogation messages within each set is small in comparison to the nominal interval of time between consecutive sets of interrogation messages if any.

9. The system set forth in claim 8 wherein said nominal time is above a value of about 5 milliseconds, thereby rendering said interrogation messages from Own station easily distinguishable from interrogation messages from SSR ground stations.

10. The system set forth in claim 8 wherein the nominal interval of time between consecutive sets of interrogation messages if any is at least about four seconds, thereby helping to minimize the amount of interference attributable to interrogation messages from Own station.

11. The system set forth in claim 8 wherein the number of consecutive interrogation messages within each set is in the range of 6 to 10.

12. The system set forth in claim 8 further comprising:
means for randomly varying the time between consecutive interrogation messages within each set about a nominal value within finite predetermined limits to help minimize interference to and from other ATC systems.

13. The system set forth in claim 8 further comprising:
means for randomly varying the time between consecutive sets of interrogation messages about a nominal value within finite predetermined limits to help minimize interference to and from other ATC systems.

14. The system set forth in claim 2 wherein means (a) enables the production and transmission of interrogation messages in one or more sets, and interrogation messages within each said set are alternated between mode A and mode C interrogation messages.

15. The system set forth in claims 1 or 2 wherein means (a) selectively enables the production of interrogation messages at Own station at one of a plurality of transmission rates chosen solely upon the SSR interrogation rate sensed at Own station.

16. A proximity warning system for an Own station, comprising:
(a) means for producing from received interrogation messages transmitted by SSRs within operational range of said Own station and received reply messages transmitted by transponder-equipped Other stations in response to said SSR interrogation messages during a predetermined period following reception of each said SSR interrogation message at Own station, a differential time of arrival value for each of said Other stations with respect to each said SSR;
(b) means for producing from received reply messages transmitted by said Other stations in response to interrogation messages transmitted from Own station during a predetermined period following transmission of each said interrogation message from Own station, a direct time of arrival value for each of said Other stations with respect to Own station;
(c) means for selecting from among the several most recent time of arrival values produced by means (b) if any and by means (a), the largest time of arrival value associated with each said Other station that has been substantially duplicated a predetermined number of times;
(d) means for producing a potential threat output in response to any time of arrival value selected by means (c) that is below a predetermined value;
(e) means for producing at least one set of interrogation messages at Own station in response to said potential threat output; and
(f) means for producing a threat alert output when said potential threat output is not negated on account of direct time of arrival values produced by means (b).

17. The system set forth in claim 16 further comprising:
(g) means responsive to an altimeter at Own station and to said received reply messages containing altitude information for producing a differential altitude value for each said identified Other station with respect to Own station; and
(h) means for preventing means (f) from producing said threat alert output in response to time of arrival values associated with any of said Other stations whose differential altitude values are greater than a predetermined amount.

18. A proximity warning system for an Own station, wherein the decision to transmit 1030 MHz interrogation messages is based at least in part upon passive detection of a potential threat through differential time of arrival techniques, said system comprising:
(a) means for producing from received interrogation messages transmitted by SSRs within operational range of said Own station and received reply messages transmitted by transponder-equipped Other stations in response to said interrogation messages during a predetermined period following reception of each said interrogation message at Own station, differential time of arrival values for said Other stations with respect to each said SSR;
(b) means for producing, from among the several most recent differential time of arrival values produced by means (a), a potential threat alert output when at least one of said Other stations appears to be, according to the largest differential time of arrival value associated therewith, within a predetermined range of Own station that defines at least in part when an Other station is deemed to be a threat;
(c) control means for enabling the production and transmission of at least a plurality of 1030 MHz interrogation messages at Own station in response to said potential threat alert output; and
(d) means for verifying from received reply messages transmitted by said Other stations in response to said interrogation messages from Own station whether said one of said Other stations is actually within said predetermined range,
whereby the number of interrogation messages transmitted from Own station to determine whether any of said Other stations is an actual threat is minimized.

19. The system set forth in claim 18, further comprising:
(e) means for providing a threat alert output when said one of said Other stations is actually within said predetermined range.

20. An integrated proximity warning system for an Own station, comprising:
(a) an active system portion having (1) interrogation decoder means for decoding SSR interrogation messages, (2) SSR environment detector and control mode selector means for automatically selecting one of a plurality of control modes in response to the number of decoded SSR interrogation messages received per unit time, and (3) 1030 MHz interrogator means for producing one or more sets of interrogation messages at any one of a plurality of transmission rates as determined by the selected control mode; and
(b) a passive system portion having (1) means for receiving SSR interrogation messages transmitted by SSRs within operational range of said Own station when said Own station is within the main beam of an SSR and also when said Own station is within a side lobe of said main beam, (2) means for receiving reply messages transmitted by transponder-equipped Other stations in response to such SSR interrogation messages during a predetermined period following reception of each SSR interrogation message at said Own station, (3) means for receiving reply messages transmitted by said Other stations in response to interrogation messages from Own station during a predetermined period following transmission of each interrogation message at Own station, (4) means for identifying each of said Other stations according to its reply messages, (5) means for determining from said received SSR interrogation messages and said reply messages in response thereto a differential time of arrival value for each said identified Other station with respect to each said SSR, (6) means for determining from said reply messages in response to interrogation messages from Own station a direct time of arrival for each of said Other stations with respect to said Own station, (7) means for selecting the largest time of arrival value related to each said identified Other station from among those identities and corresponding time of arrival values that are substantially duplicated a predetermined number of times, and (8) means for producing a threat alert output in response to any such selected time of arrival value below a predetermined value.

21. The system set forth in claim 20 wherein:
means (a)(2) further includes an input means for enabling the production of interrogations upon command in at least one of said control modes, and
means (b) further includes means for producing a potential threat output in response to differential time of arrival values selected by means (b)(7) below said predetermined value associated with means (b)(8), said potential threat output being fed into said input means as said command.

22. A proximity warning system for an Own station, comprising:
(a) means for selectively enabling the repetitive production of interrogation messages to be transmitted from Own station to nearby transponder-equipped Other stations in response to a sensed condition at Own station at one of a plurality of nominal transmission rates, and
(b) means for randomly varying any such non-zero transmission rate about its nominal value within finite limits to help minimize interference to and from other ATC systems.

23. The system set forth in claim 22 wherein said sensed condition at Own station is the approximate number of SSRs interrogating Own station.

24. The system set forth in claim 22 wherein said sensed condition at Own station is the approximate number of transponder-equipped Other stations in Own station's airspace.

25. The system set forth in claim 1 or 16, further comprising:
means for automatically and inversely varying the power with which interrogation messages are transmitted from Own station in response to at least one sensed condition at Own station.

26. The system set forth in claim 25 wherein said one sensed condition at Own station is the approximate number of SSRs interrogating Own station.

27. The system set forth in claim 25 wherein said one sensed condition at Own station is the approximate number of transponder-equipped Other stations in Own station's airspace.

28. A proximity warning system at Own station, comprising:
(a) means for selectively enabling the production of a set of interrogations to be transmitted from Own station in response to a sensed condition at Own station, said set having a nominal pulse repetition period between consecutive interrogations; and
(b) means for randomly varying the pulse repetition periods between said consecutive interrogations about their nominal value within finite predetermined limits to help minimize interference to and from other ATC systems.

29. A method of detecting at Own station a transponder-equipped Other station within a predetermined proximity to said Own station comprising the steps of:
(a) producing from received interrogation messages transmitted by SSRs within operational range of said Own station and received reply messages transmitted by transponder-equipped Other stations in response to said SSR interrogation messages during a first predetermined period following reception of each said SSR interrogation message at Own station, a differential time of arrival value for each of said Other stations with respect to each said SSR;
(b) producing from received reply messages transmitted by said Other stations in response to interrogation messages transmitted from Own station during a predetermined period following transmission of each said interrogation message from Own station, a direct time of arrival value for each of said Other stations with respect to Own station;
(c) selecting from among the several most recent time of arrival values produced by step (b) if any and by step (a), the largest differential time of arrival value associated with each said other station that has been substantially duplicated a predetermined number of times;
(d) producing a potential threat output in response to any time of arrival value selected in step (c) that is below a predetermined value;
(e) producing at least one set of interrogation messages at Own station in response to said potential threat output; and
(f) producing a threat alert output when said potential threat output is not negated on account of direct time of arrival values produced by step (b).

30. In a proximity warning system at an Own station, a method of controlling when to transmit 1030 MHz interrogation messages based at least in part upon passive detection of transponder-equipped Other stations through differential time of arrival techniques, comprising the steps of:
(a) producing from received interrogation messages transmitted by SSRs within operational range of said Own station and received reply messages transmitted by transponder-equipped Other stations in response to said interrogation messages during a predetermined period following reception of each said interrogation means at Own station, differential time of arrival values for said Other stations with respect to each said SSR;
(b) producing, from among the several most recent differential time of arrival values produced in step (a), a potential threat alert output when at least one of said Other stations appears to be, according to the largest differential time of arrival value associated therewith, within a predetermined range of Own station that defines at least in part when an Other station is deemed to be a threat;

(c) transmitting at least one 1030 MHz interrogation message at Own station in response to said potential threat alert output; and (d) verifying, from received reply messages transmitted by said Other stations in response to said interrogation message from Own station, whether said one of said Other stations is actually within said predetermined range, whereby the number of interrogation messages transmitted from Own station to determine whether any of said Other stations is an actual threat is minimized.

31. The method set forth in claim 30, further comprising the step of:

(e) providing a threat alert output when said one of said Other stations is actually within said predetermined range.

32. A method of detecting threats to an Own station that combines active and passive detection techniques, comprising the steps of:

(a) selectively producing interrogation messages at Own station at least in part in response to the SSR environment sensed at Own station;

(b) producing from received interrogation messages transmitted by SSRs within operational range of said Own station and received reply messages transmitted by transponder-equipped Other stations in response to said SSR interrogation messages during a predetermined period following reception of each said interrogation message at Own station, a differential time of arrival value for each of said Other stations with respect to each of said SSRs;

(c) producing from received reply messages transmitted by said Other stations in response to said interrogation messages from Own station during a predetermined period following transmission of each said interrogation messages from Own station, a direct time of arrival value for each of said Other stations with respect to Own station;

(d) detecting from among the several most recent time of arrival values produced by step (b) if any and by step (c) if any, the largest time of arrival value associated with each Other station that has been substantially duplicated a predetermined number of times; and (e) producing a threat alert output in response to any time of arrival value selected by step (d) that is below a predetermined value.

33. The method set forth in claim 29 or claim 32, further comprising the steps of:

producing, in response to an altimeter output at Own station and to each said received reply message containing altitude information, a differential altitude value for each said identified Other station with respect to Own station; and preventing the production of said threat alert output in response to time of arrival values associated with any of said Other stations whose differential altitude values are greater than a predetermined amount.

34. A method of operating a proximity warning system at an Own station using active 1030 MHz interrogations that helps minimize interference to other ATC systems, comprising the steps of:

(a) sensing the SSR environment at Own station through interrogations received at Own station from ground-based SSRs;

(b) classifying the sensed SSR environment according to the number of SSR interrogations received per unit time; and (c) selectively producing interrogations from Own station at one of a plurality of transmission rates determined by the classification of the SSR environment, such that the transmission rate varies in an inverse manner with the number of SSR interrogations received per unit time.

35. A method of operating a proximity warning system at an Own station using active 1030 MHz interrogations that helps minimize interference to and from other ATC systems, comprising the steps of:

(a) selectively producing 1030 MHz interrogation messages from Own station in response to a sensed condition at Own station at one of a plurality of nominal transmission rates; and (b) randomly varying any such non-zero transmission rate about its nominal value within finite predetermined limits.

36. A method of operating a proximity warning system at an Own station using active 1030 MHz interrogations that helps minimize interference to and from other ATC systems, comprising the steps of:

(a) selectively producing a set of 1030 MHz interrogations from Own station in response to a sensed condition at Own station, said set having a nominal pulse repetition period between consecutive interrogations; and (b) randomly varying the pulse repetition period between said consecutive interrogations about its value within finite predetermined limits.

37. The method set forth in claim 35 or 36 wherein said sensed condition at Own station is the approximate number of SSRs interrogating Own station.

38. The method set forth in claim 35 or 36 wherein said sensed condition at Own station is the approximate number of transponder-equipped Other stations in Own station's airspace.

* * * * *

UNITED STATES PATENT AND TRADEMARK OFFICE
CERTIFICATE OF CORRECTION

PATENT NO. : 4,642,648

DATED : Feb. 10, 1987

INVENTOR(S) : Burton L. Hulland, et al.

It is certified that error appears in the above-identified patent and that said Letters Patent is hereby corrected as shown below:

The term of this patent subsequent to December 4, 2001, has been disclaimed.

Signed and Sealed this

Eleventh Day of July, 1989

Attest:

DONALD J. QUIGG

Attesting Officer

Commissioner of Patents and Trademarks